(12) United States Patent
Chui et al.

(10) Patent No.: US 10,748,265 B2
(45) Date of Patent: *Aug. 18, 2020

(54) ARBITRARY VIEW GENERATION

(71) Applicant: Outward, Inc., San Jose, CA (US)

(72) Inventors: Clarence Chui, Los Altos Hills, CA (US); Manu Parmar, Sunnyvale, CA (US)

(73) Assignee: Outward, Inc., San Jose, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 15/967,394

(22) Filed: Apr. 30, 2018

(65) Prior Publication Data
US 2018/0247398 A1 Aug. 30, 2018

Related U.S. Application Data

(63) Continuation of application No. 15/081,553, filed on Mar. 25, 2016, now Pat. No. 9,996,914.

(51) Int. Cl.
*G06K 9/36* (2006.01)
*G06T 5/50* (2006.01)
*G06T 15/20* (2011.01)

(52) U.S. Cl.
CPC .............. *G06T 5/50* (2013.01); *G06T 15/205* (2013.01)

(58) Field of Classification Search
CPC ... G06T 15/205; G06T 7/0051; G06T 7/0065; G06T 7/0077; G06T 7/0075; G06T 5/005; G06T 2207/10028; G06T 2207/10024; G06T 5/50; G06T 3/4038; G06T 11/60; H04N 1/3876; H04N 5/23238; G06K 2009/2045

USPC .................................................. 382/154, 284
See application file for complete search history.

(56) References Cited

U.S. PATENT DOCUMENTS

| 6,222,947 | B1 | 4/2001 | Koba |
| 6,377,257 | B1 | 4/2002 | Borrel |
| 9,996,914 | B2 * | 6/2018 | Chui ........................ G06T 5/50 |
| 10,163,249 | B2 * | 12/2018 | Chui ....................... G06T 17/00 |
| 10,163,250 | B2 * | 12/2018 | Chui ..................... G06T 15/205 |

(Continued)

FOREIGN PATENT DOCUMENTS

| JP | 2000137815 | 5/2000 |
| JP | 2003187261 | 7/2003 |

(Continued)

OTHER PUBLICATIONS

Daniel Scharstein. "A Survey of Image-Based Rendering and Stereo". In: "View Synthesis Using Stereo Vision", Lecture Notes in Computer Science, vol. 1583, Jan. 1, 1999, pp. 23-39.

(Continued)

*Primary Examiner* — Duy M Dang
(74) *Attorney, Agent, or Firm* — Van Pelt, Yi & James LLP

(57) ABSTRACT

Techniques for generating an arbitrary ensemble view from existing views of a plurality of scenes are disclosed. In some embodiments, for each of a plurality of scenes, each of a corresponding set of one or more views is normalized to a desired perspective if its existing perspective is different than the desired perspective. An ensemble view comprising the plurality of scenes that has the desired perspective is generated at least in part using pixels from views of the scenes having the desired perspective including the normalized views.

54 Claims, 3 Drawing Sheets

(56) References Cited

U.S. PATENT DOCUMENTS

| 10,163,251 | B2 * | 12/2018 | Chui ..................... G06T 15/205 |
|---|---|---|---|
| 2006/0280368 | A1 | 12/2006 | Petrich |
| 2008/0143715 | A1 | 6/2008 | Moden |
| 2011/0001826 | A1 | 1/2011 | Hongo |
| 2012/0120240 | A1 | 5/2012 | Muramatsu |
| 2012/0140027 | A1 | 6/2012 | Curtis |
| 2013/0100290 | A1 | 4/2013 | Sato |

FOREIGN PATENT DOCUMENTS

| JP | 2009211335 | 9/2009 |
|---|---|---|
| JP | 20010140097 | 6/2010 |

OTHER PUBLICATIONS

Inamoto et al. "Virtual Viewpoint Replay for a Soccer Match by View Interpolation from Multiple Cameras". IEEE Transactions on Multimedia, vol. 9 No. 6, Oct. 1, 2007, pp. 1155-1166.

Sun et al. "An overview of free viewpoint Depth-Image-Based Rendering (DIBR)." Proceedings of the Second APSIPA Annual Summit and Conference. Dec. 14, 2010, pp. 1-8.

* cited by examiner

ARBITRARY VIEW GENERATION

CROSS REFERENCE TO OTHER APPLICATIONS

This application is a continuation of U.S. patent application Ser. No. 15/081,553, now U.S. Pat. No. 9,996,914, entitled ARBITRARY VIEW GENERATION filed Mar. 25, 2016 which is incorporated herein by reference for all purposes.

BACKGROUND OF THE INVENTION

Existing rendering techniques face a trade-off between competing objectives of quality and speed. A high quality rendering requires significant processing resources and time. However, slow rendering techniques are not acceptable in many applications, such as interactive, real-time applications. Lower quality but faster rendering techniques are typically favored for such applications. For example, rasterization is commonly employed by real-time graphics applications for relatively fast renderings but at the expense of quality. Thus, improved techniques that do not significantly compromise either quality or speed are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Techniques for generating an arbitrary view of a scene are disclosed. The paradigm described herein entails very low processing or computational overhead while still providing a high definition output, effectively eliminating the challenging trade-off between rendering speed and quality. The disclosed techniques are especially useful for very quickly generating a high quality output with respect to interactive, real time graphics applications. Such applications rely on substantially immediately presenting a preferably high quality output in response to and in accordance with user manipulations of a presented interactive view or scene.

Figure 1:
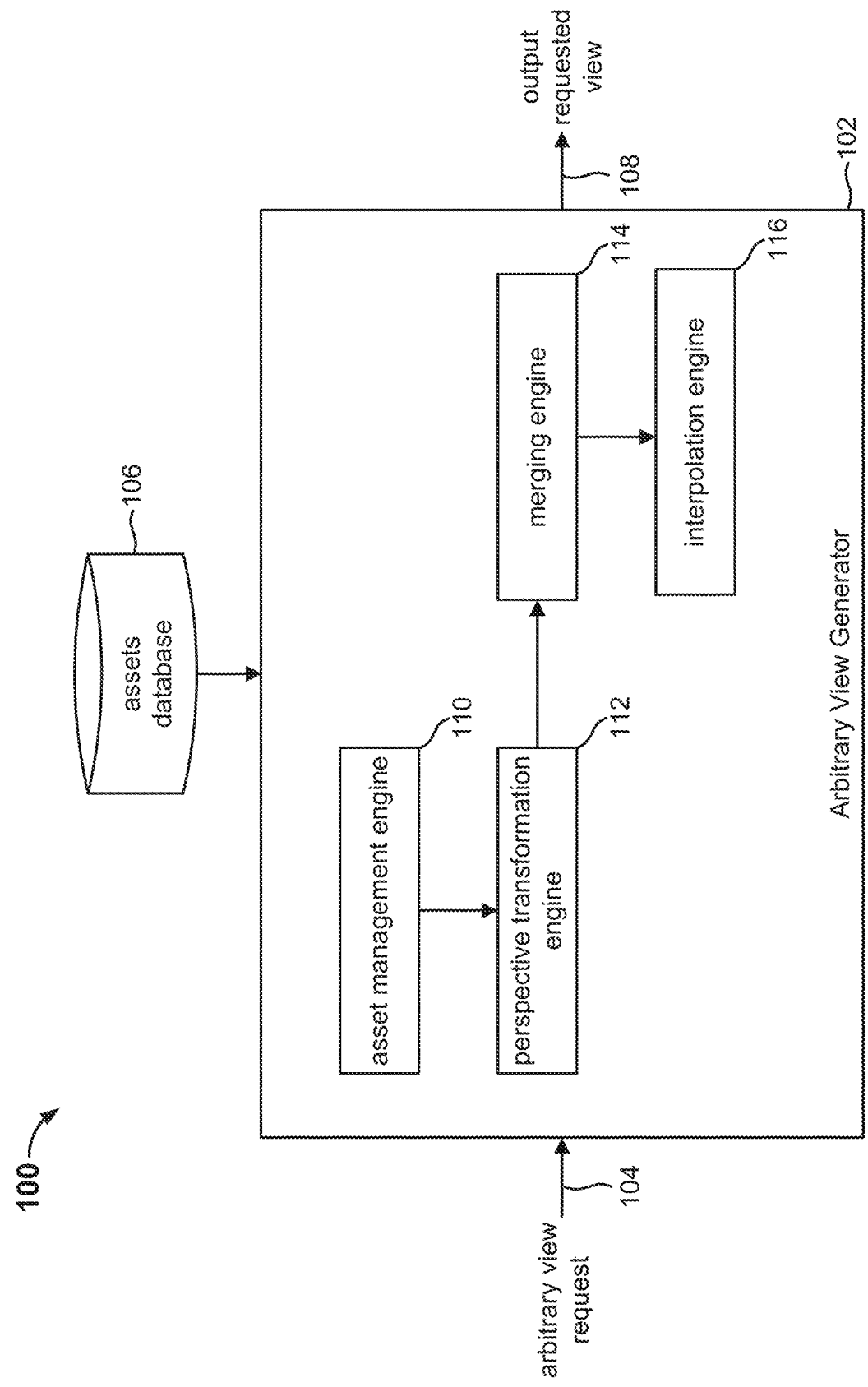
FIG. 1 is a high level block diagram illustrating an embodiment of a system for generating an arbitrary view of a scene.

FIG. 1 is a high level block diagram illustrating an embodiment of a system 100 for generating an arbitrary view of a scene. As depicted, arbitrary view generator 102 receives a request for an arbitrary view as input 104, generates the requested view based on existing database assets 106, and provides the generated view as output 108 in response to the input request. In various embodiments, arbitrary view generator 102 may comprise a processor such as a central processing unit (CPU) or a graphical processing unit (GPU). The depicted configuration of system 100 in FIG. 1 is provided for the purposes of explanation. Generally, system 100 may comprise any other appropriate number and/or configuration of interconnected components that provide the described functionality. For example, in other embodiments, arbitrary view generator 102 may comprise a different configuration of internal components 110-116, arbitrary view generator 102 may comprise a plurality of parallel physical and/or virtual processors, database 106 may comprise a plurality of networked databases or a cloud of assets, etc.

Arbitrary view request 104 comprises a request for an arbitrary perspective of a scene. In some embodiments, the requested perspective of the scene does not already exist in an assets database 106 that includes other perspectives or viewpoints of the scene. In various embodiments, arbitrary view request 104 may be received from a process or a user. For example, input 104 may be received from a user interface in response to user manipulation of a presented scene or portion thereof, such as user manipulation of the camera viewpoint of a presented scene. As another example, arbitrary view request 104 may be received in response to a specification of a path of movement or travel within a virtual environment, such as a fly-through of a scene. In some embodiments, possible arbitrary views of a scene that may be requested are at least in part constrained. For example, a user may not be able to manipulate the camera viewpoint of a presented interactive scene to any random position but rather is constrained to certain positions or perspectives of the scene.

Database 106 stores a plurality of views of each stored asset. In the given context, an asset refers to a specific scene whose specification is stored in database 106 as a plurality of views. In various embodiments, a scene may comprise a single object, a plurality of objects, or a rich virtual environment. Specifically, database 106 stores a plurality of images corresponding to different perspectives or viewpoints of each asset. The images stored in database 106 comprise high quality photographs or photorealistic renderings. Such high definition, high resolution images that populate database 106 may be captured or rendered during offline processes or obtained from external sources. In some embodiments, corresponding camera characteristics are stored with each image stored in database 106. That is, camera attributes such as relative location or position, orientation, rotation, depth information, focal length, aperture, zoom level, etc., are stored with each image. Furthermore, camera lighting information such as shutter speed and exposure may also be stored with each image stored in database 106.

Figure 2:
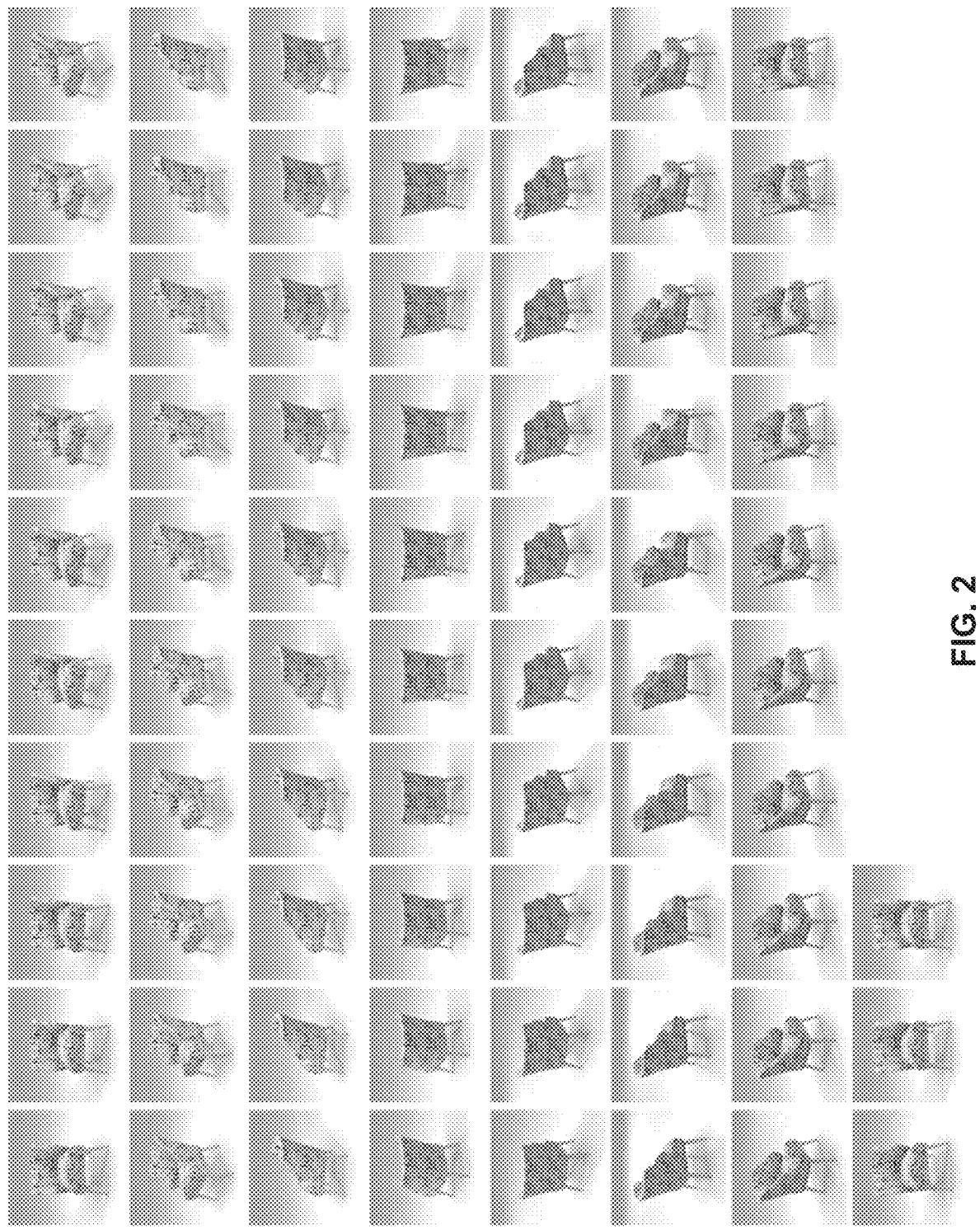
FIG. 2 illustrates an example of a database asset.

In various embodiments, any number of different perspectives of an asset may be stored in database 106. FIG. 2 illustrates an example of a database asset. In the given example, seventy-three views corresponding to different angles around a chair object are captured or rendered and stored in database 106. The views may be captured, for example, by rotating a camera around the chair or rotating the chair in front of a camera. Relative object and camera location and orientation information is stored with each generated image. FIG. 2 specifically illustrates views of a scene comprising a single object. Database 106 may also store a specification of a scene comprising a plurality of objects or a rich virtual environment. In such cases, multiple views corresponding to different locations or positions in a scene or three-dimensional space are captured or rendered and stored along with corresponding camera information in database 106. Generally, images stored in database 106 may comprise two or three dimensions and may comprise stills or frames of an animation or video sequence.

In response to a request for an arbitrary view of a scene 104 that does not already exist in database 106, arbitrary view generator 102 generates the requested arbitrary view from a plurality of other existing views of the scene stored in database 106. In the example configuration of FIG. 1, asset management engine 110 of arbitrary view generator 102 manages database 106. For example, asset management engine 110 may facilitate storage and retrieval of data in database 106. In response to a request for an arbitrary view of a scene 104, asset management engine 110 identifies and obtains a plurality of other existing views of the scene from database 106. In some embodiments, asset management engine 110 retrieves all existing views of the scene from database 106. Alternatively, asset management engine 110 may select and retrieve a subset of the existing views, e.g., that are closest to the requested arbitrary view. In such cases, asset management engine 110 is configured to intelligently select a subset of existing views from which pixels may be harvested to generate the requested arbitrary view. In various embodiments, multiple existing views may be retrieved by asset management engine 110 together or as and when they are needed by other components of arbitrary view generator 102.

The perspective of each existing view retrieved by asset management engine 110 is transformed into the perspective of the requested arbitrary view by perspective transformation engine 112 of arbitrary view generator 102. As previously described, precise camera information is known and stored with each image stored in database 106. Thus, a perspective change from an existing view to the requested arbitrary view comprises a simple geometric mapping or transformation. In various embodiments, perspective transformation engine 112 may employ any one or more appropriate mathematical techniques to transform the perspective of an existing view into the perspective of an arbitrary view. In the cases in which the requested view comprises an arbitrary view that is not identical to any existing view, the transformation of an existing view into the perspective of the arbitrary view will comprise at least some unmapped or missing pixels, i.e., at angles or positions introduced in the arbitrary view that are not present in the existing view.

Pixel information from a single perspective-transformed existing view will not be able to populate all pixels of a different view. However, in many cases, most, if not all, pixels comprising a requested arbitrary view may be harvested from a plurality of perspective-transformed existing views. Merging engine 114 of arbitrary view generator 102 combines pixels from a plurality of perspective-transformed existing views to generate the requested arbitrary view. Ideally, all pixels comprising the arbitrary view are harvested from existing views. This may be possible, for example, if a sufficiently diverse set of existing views or perspectives of the asset under consideration is available and/or if the requested perspective is not too dissimilar from the existing perspectives.

Any appropriate techniques may be employed to combine or merge pixels from a plurality of perspective-transformed existing views to generate the requested arbitrary view. In one embodiment, a first existing view that is closest to the requested arbitrary view is selected and retrieved from database 106 and transformed into the perspective of the requested arbitrary view. Pixels are then harvested from this perspective-transformed first existing view and used to populate corresponding pixels in the requested arbitrary view. In order to populate pixels of the requested arbitrary view that were not available from the first existing view, a second existing view that includes at least some of these remaining pixels is selected and retrieved from database 106 and transformed into the perspective of the requested arbitrary view. Pixels that were not available from the first existing view are then harvested from this perspective-transformed second existing view and used to populate corresponding pixels in the requested arbitrary view. This process may be repeated for any number of additional existing views until all pixels of the requested arbitrary view have been populated and/or until all existing views have been exhausted or a prescribed threshold number of existing views have already been used.

In some embodiments, a requested arbitrary view may include some pixels that are not available from any existing views. In such cases, interpolation engine 116 is configured to populate any remaining pixels of the requested arbitrary view. In various embodiments, any one or more appropriate interpolation techniques may be employed by interpolation engine 116 to generate these unpopulated pixels in the requested arbitrary view. Examples of interpolation techniques that may be employed include, for instance, linear interpolation, nearest neighbor interpolation, etc. Interpolation of pixels introduces averaging or smoothing. Overall image quality may not be significantly affected by some interpolation, but excessive interpolation may introduce unacceptable blurriness. Thus, interpolation may be desired to be sparingly used. As previously described, interpolation is completely avoided if all pixels of the requested arbitrary view can be obtained from existing views. However, interpolation is introduced if the requested arbitrary view includes some pixels that are not available from any existing views. Generally, the amount of interpolation needed depends on the number of existing views available, the diversity of perspectives of the existing views, and/or how different the perspective of the arbitrary view is in relation to the perspectives of the existing views.

With respect to the example depicted in FIG. 2, seventy-three views around a chair object are stored as existing views of the chair. An arbitrary view around the chair object that is different or unique from any of the stored views may be generated using a plurality of these existing views, with preferably minimal, if any, interpolation. However, generating and storing such an exhaustive set of existing views may not be efficient or desirable. In some cases, a significantly smaller number of existing views covering a sufficiently diverse set of perspectives may instead be generated and stored. For example, the seventy-three views of the chair object may be decimated into a small set of a handful of views around the chair object.

As previously mentioned, in some embodiments, possible arbitrary views that may be requested may at least in part be constrained. For example, a user may be restricted from moving a virtual camera associated with an interactive scene to certain positions. With respect to the given example of FIG. 2, possible arbitrary views that may be requested may be limited to arbitrary positions around the chair object but may not, for example, include arbitrary positions under the chair object since insufficient pixel data exists for the bottom of the chair object. Such constraints on allowed arbitrary views ensure that a requested arbitrary view can be generated from existing data by arbitrary view generator 102.

Arbitrary view generator 102 generates and outputs the requested arbitrary view 108 in response to input arbitrary view request 104. The resolution or quality of the generated arbitrary view 108 is the same as or similar to the qualities of the existing views used to generate it since pixels from those views are used to generate the arbitrary view. Thus, using high definition existing views in most cases results in a high definition output. In some embodiments, the generated arbitrary view 108 is stored in database 106 with other existing views of the associated scene and may subsequently be employed to generate other arbitrary views of the scene in response to future requests for arbitrary views. In the cases in which input 104 comprises a request for an existing view in database 106, the requested view does not need to be generated from other views as described; instead, the requested view is retrieved via a simple database lookup and directly presented as output 108.

Arbitrary view generator 102 may furthermore be configured to generate an arbitrary ensemble view using the described techniques. That is, input 104 may comprise a request to combine a plurality of objects into a single custom view. In such cases, the aforementioned techniques are performed for each of the plurality of objects and combined to generate a single consolidated or ensemble view comprising the plurality of objects. Specifically, existing views of each of the plurality of objects are selected and retrieved from database 106 by asset management engine 110, the existing views are transformed into the perspective of the requested view by perspective transformation engine 112, pixels from the perspective-transformed existing views are used to populate corresponding pixels of the requested ensemble view by merging engine 114, and any remaining unpopulated pixels in the ensemble view are interpolated by interpolation engine 116. In some embodiments, the requested ensemble view may comprise a perspective that already exists for one or more objects comprising the ensemble. In such cases, the existing view of an object asset corresponding to the requested perspective is employed to directly populate pixels corresponding to the object in the ensemble view instead of first generating the requested perspective from other existing views of the object.

As an example of an arbitrary ensemble view comprising a plurality of objects, consider the chair object of FIG. 2 and an independently photographed or rendered table object. The chair object and the table object may be combined using the disclosed techniques to generate a single ensemble view of both objects. Thus, using the disclosed techniques, independently captured or rendered images or views of each of a plurality of objects can be consistently combined to generate a scene comprising the plurality of objects and having a desired perspective. As previously described, depth information of each existing view is known. The perspective transformation of each existing view includes a depth transformation, allowing the plurality of objects to be appropriately positioned relative to one another in the ensemble view.

Generating an arbitrary ensemble view is not limited to combining a plurality of single objects into a custom view. Rather, a plurality of scenes having multiple objects or a plurality of rich virtual environments may be similarly combined into a custom ensemble view. For example, a plurality of separately and independently generated virtual environments, possibly from different content generation sources and possibly having different existing individual perspectives, may be combined into an ensemble view having a desired perspective. Thus, generally, arbitrary view generator 102 may be configured to consistently combine or reconcile a plurality of independent assets comprising possibly different existing views into an ensemble view having a desired, possibly arbitrary perspective. A perfectly harmonious resulting ensemble view is generated since all combined assets are normalized to the same perspective. The possible arbitrary perspectives of the ensemble view may be constrained based on the existing views of the individual assets available to generate the ensemble view.

Figure 3:
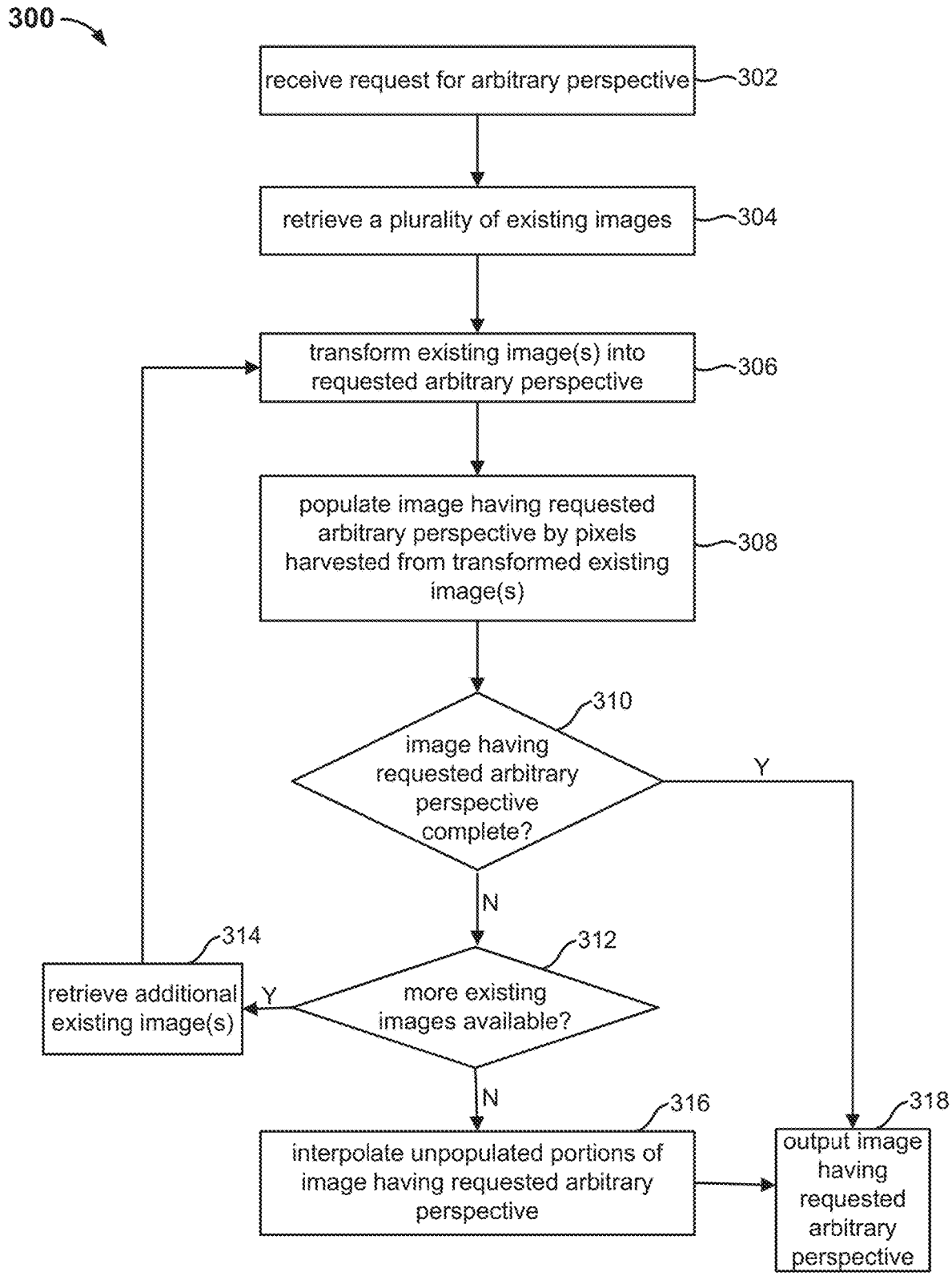
FIG. 3 is a flow chart illustrating an embodiment of a process for generating an arbitrary perspective.

FIG. 3 is a flow chart illustrating an embodiment of a process for generating an arbitrary perspective. Process 300 may be employed, for example, by arbitrary view generator 102 of FIG. 1. In various embodiments, process 300 may be employed to generate an arbitrary view of a prescribed asset or an arbitrary ensemble view.

Process 300 starts at step 302 at which a request for an arbitrary perspective is received. In some embodiments, the request received at step 302 may comprise a request for an arbitrary perspective of a prescribed scene that is different from any existing available perspectives of the scene. In such cases, for example, the arbitrary perspective request may be received in response to a requested change in perspective of a presented view of the scene. Such a change in perspective may be facilitated by changing or manipulating a virtual camera associated with the scene, such as by panning the camera, changing the focal length, changing the zoom level, etc. Alternatively, in some embodiments, the request received at step 302 may comprise a request for an arbitrary ensemble view. As one example, such an arbitrary ensemble view request may be received with respect to an application that allows a plurality of independent objects to be selected and provides a consolidated, perspective-corrected ensemble view of the selected objects.

At step 304, a plurality of existing images from which to generate at least a portion of the requested arbitrary perspective is retrieved from one or more associated assets databases. The plurality of retrieved images may be associated with a prescribed asset in the cases in which the request received at step 302 comprises a request for an arbitrary perspective of a prescribed asset or may be associated with a plurality of assets in the cases in which the request received at step 302 comprises a request for an arbitrary ensemble view.

At step 306, each of the plurality of existing images retrieved at step 304 that has a different perspective is transformed into the arbitrary perspective requested at step 302. Each of the existing images retrieved at step 304 includes associated perspective information. The perspective of each image is defined by the camera characteristics associated with generating that image such as relative position, orientation, rotation, angle, depth, focal length, aperture, zoom level, lighting information, etc. Since complete camera information is known for each image, the perspective transformation of step 306 comprises a simple mathematical operation. In some embodiments, step 306 also optionally includes a lighting transformation so that all images are consistently normalized to the same desired lighting conditions.

At step 308, at least a portion of an image having the arbitrary perspective requested at step 302 is populated by pixels harvested from the perspective-transformed existing images. That is, pixels from a plurality of perspective-corrected existing images are employed to generate an image having the requested arbitrary perspective.

At step 310, it is determined whether the generated image having the requested arbitrary perspective is complete. If it is determined at step 310 that the generated image having the requested arbitrary perspective is not complete, it is determined at step 312 whether any more existing images are available from which any remaining unpopulated pixels of the generated image may be mined. If it is determined at step 312 that more existing images are available, one or more additional existing images are retrieved at step 314, and process 300 continues at step 306.

If it is determined at step 310 that the generated image having the requested arbitrary perspective is not complete and if it is determined at step 312 that no more existing images are available, any remaining unpopulated pixels of the generated image are interpolated at step 316. Any one or more appropriate interpolation techniques may be employed at step 316.

If it is determined at step 310 that the generated image having the requested arbitrary perspective is complete or after interpolating any remaining unpopulated pixels at step 316, the generated image having the requested arbitrary perspective is output at step 318. Process 300 subsequently ends.

As described, the disclosed techniques may be used to generate an arbitrary perspective based on other existing perspectives. Normalizing different existing perspectives into a common, desired perspective is possible since camera information is preserved with each existing perspective. A resulting image having the desired perspective can be constructed from mining pixels from perspective-transformed existing images. The processing associated with generating an arbitrary perspective using the disclosed techniques is not only fast and nearly instantaneous but also results in a high quality output, making the disclosed techniques particularly powerful for interactive, real-time graphics applications.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
obtain, for each of a plurality of different scenes, a corresponding set of one or more views;
normalize, to a desired perspective, each of the set of views of each scene that has a different existing perspective than the desired perspective; and
generate an ensemble view comprising the plurality of different scenes that has the desired perspective at least in part using pixels from views of the scenes having the desired perspective including the normalized views; and
a memory coupled to the processor and configured to provide the processor with instructions.

2. The system of claim 1, wherein each scene comprises an object, a plurality of objects, or a rich virtual environment.

3. The system of claim 1, wherein one or more views comprising the set of views of a scene are independently captured, rendered, or both.

4. The system of claim 1, wherein the set of views of a scene comprises photographs, photorealistic renderings, or both.

5. The system of claim 1, wherein the set of views of at least one scene comprises all existing views of that scene available.

6. The system of claim 1, wherein the set of views of at least one scene comprises a subset of all existing views of that scene available.

7. The system of claim 1, wherein the set of views of at least one scene comprises a threshold number of views.

8. The system of claim 1, wherein the set of views of at least one scene comprises a single view whose existing perspective comprises the desired perspective.

9. The system of claim 1, wherein camera characteristics are stored with and known for each obtained view.

10. The system of claim 9, wherein the camera characteristics include one or more of: position, orientation, rotation, angle, depth, focal length, aperture, zoom level, shutter speed, and exposure.

11. The system of claim 1, wherein to normalize comprises to transform to the desired perspective from an existing perspective based on known camera information associated with each view.

12. The system of claim 1, wherein to normalize comprises to transform depth based on known depth information associated with each view.

13. The system of claim 1, wherein the processor if further configured to normalize to a desired lighting condition based on known lighting information associated with each view.

14. The system of claim 1, wherein to generate the ensemble view comprises to interpolate one or more pixels of the ensemble view that are not available from any views of the scenes.

15. The system of claim 1, wherein the plurality of scenes is separately and independently generated.

16. The system of claim 1, wherein the desired perspective is constrained based on existing perspectives of views of the scenes available to generate the ensemble view.

17. The system of claim 1, wherein the ensemble view comprises one or more of:
a still image, a view of a three-dimensional space, and a view of a virtual environment.

18. The system of claim 1, wherein the ensemble view comprises a frame of an animation or video sequence.

19. A method, comprising:
obtaining, for each of a plurality of different scenes, a corresponding set of one or more views;
normalizing, to a desired perspective, each of the set of views of each scene that has a different existing perspective than the desired perspective; and
generating an ensemble view comprising the plurality of different scenes that has the desired perspective at least in part using pixels from views of the scenes having the desired perspective including the normalized views.

20. The method of claim 19, wherein each scene comprises an object, a plurality of objects, or a rich virtual environment.

21. The method of claim 19, wherein one or more views comprising the set of views of a scene are independently captured, rendered, or both.

22. The method of claim 19, wherein the set of views of a scene comprises photographs, photorealistic renderings, or both.

23. The method of claim 19, wherein the set of views of at least one scene comprises all existing views of that scene available.

24. The method of claim 19, wherein the set of views of at least one scene comprises a subset of all existing views of that scene available.

25. The method of claim 19, wherein the set of views of at least one scene comprises a threshold number of views.

26. The method of claim 19, wherein the set of views of at least one scene comprises a single view whose existing perspective comprises the desired perspective.

27. The method of claim 19, wherein camera characteristics are stored with and known for each obtained view.

28. The method of claim 27, wherein the camera characteristics include one or more of: position, orientation, rotation, angle, depth, focal length, aperture, zoom level, shutter speed, and exposure.

29. The method of claim 19, wherein normalizing comprises transforming to the desired perspective from an existing perspective based on known camera information associated with each view.

30. The method of claim 19, wherein normalizing comprises transforming depth based on known depth information associated with each view.

31. The method of claim 19, further comprising normalizing to a desired lighting condition based on known lighting information associated with each view.

32. The method of claim 19, wherein generating the ensemble view comprises interpolating one or more pixels of the ensemble view that are not available from any views of the scenes.

33. The method of claim 19, wherein the plurality of scenes is separately and independently generated.

34. The method of claim 19, wherein the desired perspective is constrained based on existing perspectives of views of the scenes available to generate the ensemble view.

35. The method of claim 19, wherein the ensemble view comprises one or more of: a still image, a view of a three-dimensional space, and a view of a virtual environment.

36. The method of claim 19, wherein the ensemble view comprises a frame of an animation or video sequence.

37. A computer program product embodied in a non-transitory computer readable storage medium and comprising computer instructions for:
obtaining, for each of a plurality of different scenes, a corresponding set of one or more views;
normalizing, to a desired perspective, each of the set of views of each scene that has a different existing perspective than the desired perspective; and
generating an ensemble view comprising the plurality of different scenes that has the desired perspective at least in part using pixels from views of the scenes having the desired perspective including the normalized views.

38. The computer program product of claim 37, wherein each scene comprises an object, a plurality of objects, or a rich virtual environment.

39. The computer program product of claim 37, wherein one or more views comprising the set of views of a scene are independently captured, rendered, or both.

40. The computer program product of claim 37, wherein the set of views of a scene comprises photographs, photorealistic renderings, or both.

41. The computer program product of claim 37, wherein the set of views of at least one scene comprises all existing views of that scene available.

42. The computer program product of claim 37, wherein the set of views of at least one scene comprises a subset of all existing views of that scene available.

43. The computer program product of claim 37, wherein the set of views of at least one scene comprises a threshold number of views.

44. The computer program product of claim 37, wherein the set of views of at least one scene comprises a single view whose existing perspective comprises the desired perspective.

45. The computer program product of claim 37, wherein camera characteristics are stored with and known for each obtained view.

46. The computer program product of claim 45, wherein the camera characteristics include one or more of: position, orientation, rotation, angle, depth, focal length, aperture, zoom level, shutter speed, and exposure.

47. The computer program product of claim 37, wherein normalizing comprises transforming to the desired perspective from an existing perspective based on known camera information associated with each view.

48. The computer program product of claim 37, wherein normalizing comprises transforming depth based on known depth information associated with each view.

49. The computer program product of claim 37, further comprising computer instructions for normalizing to a desired lighting condition based on known lighting information associated with each view.

50. The computer program product of claim 37, wherein generating the ensemble view comprises interpolating one or more pixels of the ensemble view that are not available from any views of the scenes.

51. The computer program product of claim 37, wherein the plurality of scenes is separately and independently generated.

52. The computer program product of claim 37, wherein the desired perspective is constrained based on existing perspectives of views of the scenes available to generate the ensemble view.

53. The computer program product of claim 37, wherein the ensemble view comprises one or more of: a still image, a view of a three-dimensional space, and a view of a virtual environment.

54. The computer program product of claim 37, wherein the ensemble view comprises a frame of an animation or video sequence.

* * * * *

UNITED STATES PATENT AND TRADEMARK OFFICE
CERTIFICATE OF CORRECTION

PATENT NO. : 10,748,265 B2  
APPLICATION NO. : 15/967394  
DATED : August 18, 2020  
INVENTOR(S) : Chui et al.

Page 1 of 1

It is certified that error appears in the above-identified patent and that said Letters Patent is hereby corrected as shown below:

In the Claims

Column 8, Line 42, delete "if" and insert --is--.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*